Patented July 26, 1949

2,477,321

UNITED STATES PATENT OFFICE 2,477,321

SUPPRESSING CORROSION IN WELLS

Prentiss S. Viles and Elza Q. Camp, Goose Creek, Tex., assignors to Standard Oil Development Company, a corporation of Delaware No Drawing. Application January 24, 1946, Serial No. 643,208

3 Claims. (Cl. 252—8.55)

The present invention is directed to the production of fluids from under ground formations. More particularly, the invention is directed to protecting the conduits and attendant equipment, through which fluids from subsurface formations are flowed and processed, from corrosion by materials occurring in or are introduced into fluids originating in subsurface formations.

In many oil, gas, and condensate fields, the production of fluids from subsurface formations is accompanied by extremely severe corrosion of the conduits and attendant equipment which come into contact with the fluid mixture being produced. In many cases it is found that the fluid mixture is acidic in nature and comprises substantial amounts of carbon dioxide, a portion of which dissolves in water present to form carbonic acid. In addition to the carbon dioxide other materials which are present in the corrosive mixture may include organic acids, inorganic acids, inorganic salts and acidic sulfur compounds. These corrosive substances occur in or are introduced into the fluids originating in the subsurface formations. In some cases the corrosion occurs throughout the conduits and attendant equipment through which the fluids from the subsurface formations are flowed and processed. In other cases the corrosion is limited primarily to portions of the conduits near the surface of the wells and to the wellhead and attendant equipment. In all cases it has been necessary to make extensive replacements of equipment that has failed as a result of corrosion. This not only limits production, but is extremely expensive, particularly in those cases in which it is necessary to kill a high pressure well in order to make repairs and to replace corroded equipment. In addition to the high costs of making repairs to well equipment, there is a marked loss in revenues due to having a well off production and to the necessity of having to maintain additional wells and sources of supply to meet production requirements during periods in which a well is off production for repairs as a result of corrosion. Further, there is constant danger that a well will flow wild as a result of the failure of equipment due to corrosion. In cases of this kind, enormous losses are incurred.

It is, therefore, the main object of the present invention to provide a method whereby corrosion is substantially eliminated or inhibited in the conduits and attendant equipment through which fluids from subsurface formations are flowed and processed.

In accordance with the present invention, acidic corrosion of the aforementioned type of fluid mixtures is substantially eliminated or inhibited by injecting into the fluids produced from subsurface formations small amounts of phenolic materials. As specific examples of such phenolic materials may be mentioned substantially pure phenols and cresols and mixtures thereof as well as crude phenols or cresols or mixtures thereof. It has been found particularly advantageous to employ crude phenolic materials derived from petroleum for this purpose. Methods of obtaining such crude petroleum phenolic materials are described in U. S. Patent 2,213,596, filed in the name of Shmidl et al. and issued September 3, 1940.

The amount of the phenolic material to be employed to suppress the corrosion within the well in accordance with the present invention may range from a trace up to about 3% by weight based upon the weight of the fluid produced from the subsurface formation. When operating in accordance with the present invention it will usually be found desirable to employ .1% weight of the inhibitor to suppress corrosion.

The phenolic material employed as the inhibitor may be injected into the ferrous conduit through which the fluid mixture is being produced from the subsurface formation or it may be introduced into the borehole adjacent the subsurface formation and dissolve in the fluid mixture as it is produced from the formation into the borehole. When it is desired to inject the inhibiting substance into the conduit, this may be accomplished by connecting a suitable source of the inhibiting substance by suitable conduits to the conduit through which the fluid containing the corrosive substance is flowing and, by superimposing a suitable pressure thereon forcing the inhibiting substance into the conduit through which the fluid mixture is being produced.

Another method of suppressing corrosion in the well is to inject the phenolic materials directly into the subsurface reservoir so that the fluid entering the conduit comprises an inhibiting amount of the phenolic material. An adjacent well or a conduit other than the conduit through which the fluid containing the corrosive materials is flowed may be employed for this purpose.

The reason why these phenolic materials are effective in preventing the aforementioned type of corrosion reactions is not understood, but it is believed to be due to the formation of a protective film on the metal. It is to be understood, however, that we do not wish to be bound by any theory offered by way of explanation of the beneficial results obtained.

An advantage of the process of the present invention, irrespective of the prevention of corrosion of the conduits and attendant equipment through which fluids from subsurface formations are flowed and processed, is the ability to operate without the loss of production as a result of the failure of equipment by corrosion. The danger of a well flowing wild is minimized and the necessity of maintaining a surplus of wells to insure production requirements is eliminated.

In order to illustrate further the beneficial effects of the present invention, the following example is given:

Example

Test pieces of carbon steel were immersed in water solutions under a pressure of 100 pounds per square inch gauge of carbon dioxide and the test pieces were maintained under this pressure for an interval of 24 hours and at a temperature of 170° F. The carbon dioxide was admitted into the system through a pressure regulator valve thus maintaining a constant pressure of carbon dioxide in the system so that the water solutions in which the carbon steel test specimens were immersed were saturated with carbon dioxide at the temperatures and pressures at which the tests were conducted. One of these solutions was employed as a blank with no inhibiting material added. To another solution 1% by weight of a mixture of crude petroleum phenols was added. To another of the solutions an inhibiting material comprising 1% by weight of chemically pure phenol was added. The results obtained by the tests are shown in the following table:

Table

| Inhibiting Material | Corrosion Rate Inches Per Year | Reduction of Corrosion by Inhibition Percent |
|---|---|---|
| None | 0.225 | |
| Crude Petroleum Phenols | 0.0065 | 97.1 |
| Chemically Pure Phenol | 0.031 | 86.8 |

It will be observed from the data presented above that the addition of a small amount of phenolic material effects a marked reduction in corrosion under conditions approximating those existing in equipment employed for producing fluids from subsurface formations.

The nature and objects of the present invention having been fully described and illustrated, what we wish to claim as new and useful and to secure by Letters Patent is:

1. In the production from a subsurface formation of a corrosive fluid mixture having an acid reaction and including hydrocarbon, water, and carbon dioxide, which is brought into contact with ferrous metal as it is being produced, the step of introducing into said fluid mixture, an amount of an acidic phenolic material sufficient to inhibit the corrosive action of the fluid mixture on the ferrous metal with which it comes into contact.

2. A method in accordance with claim 1 in which the phenolic material is a mixture of crude petroleum phenols.

3. A method in accordance with claim 1 in which the phenolic material is a substantially pure phenol.

PRENTISS S. VILES.
ELZA Q. CAMP.

REFERENCES CITED

The following references are of record in the file of this patent:

UNITED STATES PATENTS

| Number | Name | Date |
|---|---|---|
| 1,829,705 | Walker | Oct. 27, 1931 |
| 1,988,823 | Winning et al. | Jan. 22, 1935 |
| 2,002,523 | Buc | May 28, 1935 |
| 2,202,825 | Brandes | June 4, 1940 |
| 2,213,596 | Shmidl et al. | Sept. 3, 1940 |
| 2,398,120 | Schindler | Apr. 9, 1946 |